(12) United States Patent
Ni et al.

(10) Patent No.: US 9,564,745 B1
(45) Date of Patent: Feb. 7, 2017

(54) REPLACEABLE PANEL STRUCTURE AND SOCKET, SWITCH AND HUMIDITY SENSOR WITH REPLACEABLE PANEL

(71) Applicant: Wenzhou MTLC Electric Co., Ltd., Yueqing, Wenzhou (CN)

(72) Inventors: Lidong Ni, Yueqing (CN); Wei Gao, Yueqing (CN)

(73) Assignee: Wenzhou MTLC Electric Co., LTD, Yueqing (CN)

( * ) Notice: Subject to any disclaimer, the term of this patent is extended or adjusted under 35 U.S.C. 154(b) by 0 days.

(21) Appl. No.: 14/952,425

(22) Filed: Nov. 25, 2015

(30) Foreign Application Priority Data

Jul. 20, 2015 (CN) .......................... 2015 1 0427410

(51) Int. Cl.
 *H02G 3/14* (2006.01)
 *H02G 3/08* (2006.01)
(52) U.S. Cl.
 CPC ................ *H02G 3/14* (2013.01); *H02G 3/081* (2013.01)
(58) Field of Classification Search
 USPC .......................................................... 174/66
 See application file for complete search history.

(56) References Cited

U.S. PATENT DOCUMENTS 3,732,524 A * 5/1973 Reed .................... H01R 25/006
 439/142
6,600,117 B1 * 7/2003 Gretz ....................... H02G 3/14
 174/502

* cited by examiner

*Primary Examiner* — Dhirubhai R Patel
(74) *Attorney, Agent, or Firm* — Ziegler IP Law Group, LLC

(57) ABSTRACT

A replaceable panel structure and a socket, switch and humidity sensor with the replaceable panel. The replaceable panel structure includes a base, and a panel main body which is replaceably mounted on the base by a snap structure having first snap structures and second snap structures, wherein each of the first snap structures includes a first elastic snap disposed on the panel main body and a stop block disposed on the base, a first slot fitted with the first elastic snap being formed on one side of the stop block away from the panel main body, the first elastic snap being deformed due to the stop of the stop block and then snapped into or released from the first slot; each of the second snap structures includes a second snap disposed on the panel main body and a second slot disposed on the base and fitted with the second snap, the second snap being able to be inserted into or released from the second slot in a horizontal direction.

12 Claims, 5 Drawing Sheets

REPLACEABLE PANEL STRUCTURE AND SOCKET, SWITCH AND HUMIDITY SENSOR WITH REPLACEABLE PANEL

FIELD

The disclosed embodiments relate to the field of electrical apparatus elements, in particular to a replaceable panel structure and a socket, switch and humidity sensor with a replaceable panel.

BACKGROUND

When using electrical apparatus elements such as sockets, switches and humidity sensors, the matching degree of the color of a panel thereon with surroundings will be usually taken into consideration in order to achieve the aesthetically pleasing effect in relation to the surrounding environment. For a conventional electrical apparatus element, the panel is usually integrated with the electrical apparatus element main body and non-replaceable, so it is required to replace the whole electrical apparatus element when the color of the panel is not matched with the surroundings. In addition, if the panel of an electrical apparatus element such as a socket, a switch and a humidity sensor is damaged, the whole electrical apparatus element will be replaced, thereby resulting in waste in cost.

An existing wall type switch socket with a replaceable panel consists of a switch assembly, a fixed bottom plate, slots, a snap, a switch socket, positioning snapping tongues, a decorative panel and a hollow cylindrical body, wherein the hollow cylindrical body is provided between the switch assembly and the switch socket, one or more outwardly convex positioning snapping tongues being provided on one end of the hollow cylindrical body close to the fixed bottom plate, the inwardly concave slots being provided on an inner wall of the decorative panel, the decorative panel being transversely fixed through the fitting of the slots with the positioning snapping tongues on the hollow cylindrical body; two or more inwardly concave slots are provided at the other end of the hollow cylindrical body, and a small opening, provided therein with a snap fitted with the slots, is formed in the middle of the decorative panel, so that the switch assembly is integrated with the decorative panel and the switch socket by snapping and fixing two ends of the snap into the slots. Although the above wall type switch socket may also realize the replaceability of the panel, the withdrawing of the snap is realized by inwardly pressing the two hook-like ends of the snap snapped into the slots and then pulling the snap outward, so that it is likely to damage the snap due to too large force during disassembly and replacement. If the force is too small, the two hook-like ends of the snap are not likely to be released from the slots. If the two ends of the snap are forcibly taken out, it is likely to damage the hook-like portions. Moreover, the replaceable structure is complicated and difficult to disassemble.

Accordingly, it would be desirable to provide a replaceable panel structure and a socket that addresses at least some of the problems identified above.

SUMMARY

Hereby, a technical problem to be solved by the disclosed embodiments is, in view of an existing replaceable panel structure being likely to damage a snap and difficult to be disassembled during disassembly and replacement, to provide a replaceable panel structure with simple structure, easy disassembly and stable engagement and a socket, a switch and a humidity sensor with a replaceable panel.

To solve the technical problem, the disclosed embodiments provide a replaceable panel structure, including a base, and a panel main body which is replaceably mounted on the base by a snap structure, wherein that snap structure includes: first snap structures, each comprising a first elastic snap disposed on the panel main body and a stop block disposed on the base, a first slot fitted with the first elastic snap being formed on one side of the stop block away from the panel main body, the first elastic snap being pressed and deformed due to the stop of the stop block and then snapped into or released from the first slot in the process of being snapped with the base along with the panel main body or being disengaged from the first slot along with the panel main body; and second snap structures, each comprising a second snap disposed on the panel main body and a second slot disposed on the base and fitted with the second snap, the second snap being able to be inserted into or released from the second slot in a horizontal direction.

The first elastic snap is hook-like and comprises a handle and a first protruded snapping portion, one end of the handle being connected to the panel main body while the first protruded snapping portion being provided on a side wall of the other end of the handle; and in the process of the first elastic snap being snapped into the base along with the panel main body or being disengaged from the first slot along with the panel main body, the first protruded snapping portion is stopped and pressed by the stop block, and the handle is elastically deformed to rotate around a connection point with the panel main body in a direction away from the stop block, so that the first protruded snapping portion passes over the stop block and the handle is restored to allow the first protruded snapping portion to be snapped into or released from the first slot.

A press-guide inclined plane is formed above the stop block; a lower end of the press-guide inclined plane being connected with an edge, pressing the first protruded snapping portion, of the stop block, and in the process of first elastic snap being vertically inserted along the press-guide inclined plane, the first protruded snapping portion is pressed by the press-guide inclined plane and the handle gradually rotates around the connection point with the panel main body in the direction away from the stop block, so that the first protruded snapping portion passes over the stop block and the handle is restored to allow the first protruded snapping portion to be snapped into the first slot; an upper end face of the first protruded snapping portion is designed to an release-guide inclined plane; when the first elastic snap is released, the first protruded snapping portion is pressed by the release-guide inclined plane and the handle gradually rotates around the connection point with the panel main body in the direction away from the stop block, so that the first protruded snapping portion passes over the stop block and the handle is restored to allow the first protruded snapping portion to be released from the first slot.

Guide side walls are provided on two sides of the press-guide inclined plane, the press-guide inclined plane and the guide side walls form a snap-in guide press groove, and the lower end face of the first protruded snapping portion is designed to a fit inclined plane fitted with the press-guide inclined plane.

The second snap comprises a main body portion with an end connected to the panel main body, and a second protruded snapping portion disposed on a side wall of the main body portion; and the second slot comprises a main groove portion for allowing the main body portion to be horizontally embedded thereinto, and a snap-slot portion for allowing the second protruded snapping portion horizontally embedded thereinto.

The second slot is formed at an end corner of the base, the main body portion comprises a quarter arc plate and a flat plate connected to one end of the arc plate, and the second protruded snapping portion is disposed on an end face of the other end of the arc plate.

One end of the flat plate not connected to the arc plate forms an inwardly concave sharp corner groove or an outwardly convex sharp corner, and the a sharp corner or sharp corner groove fitted with the sharp corner groove or sharp corner is formed on a corresponding side wall of the main groove portion.

The upper end face of the second protruded snapping portion is designed to be a first inclined plane, and a second inclined plane in insertion fit with the first inclined plane is formed on a corresponding side wall of the snap-slot portion.

The first snap structures and the second snap structures are located at two ends of the panel main body, respectively.

There are two first snap structures and two second snap structures.

A socket with a replaceable panel according to the disclosed embodiments comprises the above replaceable panel structure, and jacks are provided on the panel main body.

A switch with a replaceable panel according to the disclosed embodiments comprises the above replaceable panel structure, and a switch button is provided on the panel main body.

A humidity sensor with a replaceable panel according to the disclosed embodiments comprises the above replaceable panel structure, and a function button of the sensor is provided on the panel main body.

Compared with the prior art, the technical solutions of the disclosed embodiments have the following advantages.

(1) The replaceable panel structure provided by the disclosed embodiments includes a base, and a panel main body which is replaceably mounted on the base by a snap structure including first snap structures and a second snap structures, wherein each of the first snap structures includes a first elastic snap disposed on the panel main body and a stop block disposed on the base, a first slot fitted with the first elastic snap being formed on one side of the stop block away from the panel main body, the first elastic snap being pressed and deformed due to the stop of the stop block and then snapped into or released from the first slot in the process of being snapped into the base along with the panel main body or being disengaged from the first slot along with the panel main body; each of the second snap structures comprises a second snap disposed on the panel main body and a second slot disposed on the base and fitted with the second snap, the second snap being able to be inserted into or released from the second slot in a horizontal direction. In the disclosed embodiments, the mounting and disassembling process is simple and convenient, and the cooperative use of the first snap structures and the second snap structures makes the joint of the panel and the base stable. Moreover, during disassembly, the second snap is released from the second slot in a horizontal direction, i.e., in a direction toward a notch of the second slot, so it is not required to overcome the snapping force between the second snap and the second slot during disassembly, and it is only required to overcome a single-side snapping force between the first snap and the first slot, so that the it is easy to disassemble and less likely to damage after multiple times of disassembling.

(2) In the replaceable panel structure provided by the disclosed embodiments, a press-guide inclined plane is formed above the stop block, and a lower end of the press-guide inclined plane is connected with an edge, pressing the first protruded snapping portion, of the stop block. The arrangement of the press-guide inclined plane allows the first protruded snapping portion to be in transition contact with the press-guide inclined plane and then to reach the edge of the stop block, so that the handle gradually rotates around the connection point with the panel main body in the direction away from the stop block, the first protruded snapping portion gradually passes over the stop block and the handle is restored to allow the first protruded snapping portion to be snapped into the first slot. Thus, it is convenient for the first protruded snapping portion to pass by the edge of the stop block, the process of the first protruded snapping portion being snapping into the first slot is smooth and quick, and it is less likely to damage the connection point of the handle with the panel main body. The release-guide inclined plane makes the contact with the stop block smooth when the first protruded snapping portion is released from the first slot, so that it is convenient for the first protruded snapping portion to pass by the edge of the stop block, the process of the first protruded snapping portion being released from the first slot is smooth and quick, and it is less likely to damage the connection point of the handle with the panel main body.

(3) In the replaceable panel structure provided by the disclosed embodiments, one end of the flat plate not connected to the arc plate forms an inwardly concave sharp corner groove or an outwardly convex sharp corner, and a sharp corner or sharp corner groove fitted with the sharp corner groove or sharp corner is formed on a corresponding side wall of the main groove portion. Through the fit structure of the share corner with the sharp corner groove, the second slot may limit the second snap, and two sides of the sharp corner or sharp corner groove may disperse a force resulted from the joint of the second snap and the second slot, so that the damage to the second snap and the second slot may be reduced and the service life is prolonged.

(4) In the replaceable panel structure provided by the disclosed embodiments, the upper end face of the second protruded snapping portion is designed to be a first inclined plane, and a second inclined plane in insertion fit with the first inclined plane is formed on a corresponding side wall of the snap-slot portion. The first inclined plane and the second inclined plane facilitate the release of the second protruded snapping portion from the second slot during disassembling the panel.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

To make the content of the disclosed embodiments to be more easily and clearly understood, the disclosed embodiments will be further described below in detail with reference to the accompanying drawings by specific embodiments of the disclosed embodiments, wherein.

Figure 1:
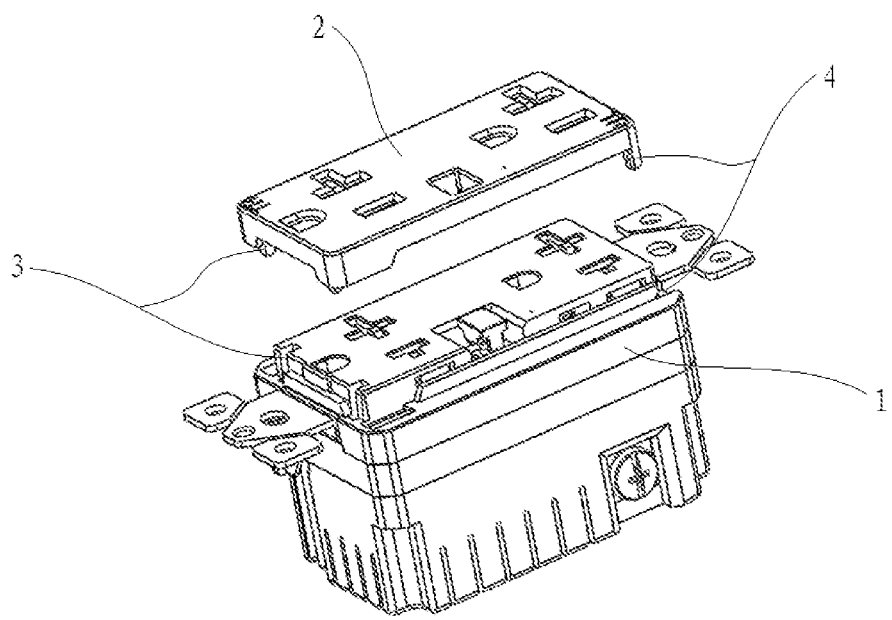
FIG. 1 is a perspective view of a replaceable panel structure according to embodiment 1 and a socket with a replaceable panel according to embodiment 2, where a state of the panel being separated from the base is shown.

in which:

1: base;
2: panel main body;
3: first snap structure;
31: first elastic snap;
311: handle;
312: first protruded snapping portion;
313: release-guide inclined plane;
314: fit inclined plane;
32: stop block;
33: first slot;
34: press-guide groove;
341: press-guide inclined plane;
342: guide side wall;
4: second snap structure;
41: second snap;
411: main body portion;
412: second protruded snapping portion;
413: arc plate;
414: flat plate;
415: first inclined plane;
416: sharp corner groove;
42: second slot;
421: main groove portion;
422: snap-slot portion;
423: second inclined plane;
424: sharp corner;
5: jack;
6: switch button.

DETAILED DESCRIPTION OF THE INVENTION

The disclosed embodiments will be further explained below with reference to the accompanying drawings by the following embodiments.

Embodiment 1

Referring to FIG. 1 to FIG. 4, the disclosed embodiments provides a replaceable panel structure, including a base 1, and a panel main body 2 which is replaceably mounted on the base 1 by a snap structure, wherein the snap structure includes:

first snap structures 3, each including a first elastic snap 31 disposed on the panel main body 2 and a stop block 32 disposed on the base 1, with a first slot 33 fitted with the first elastic snap 31 being formed on one side of the stop block 32 away from the panel main body 2, and the first elastic snap 31 being deformed due to the stop of the stop block 32 and then snapped into or released from the first slot 33 in the process of being snapped into the base 1 along with the panel main body 2 or being released from the first slot 33 along with the panel main body 2; and second snap structures 4, each including a second snap 41 disposed on the panel main body 2 and a second slot 42 disposed on the base 1 and fitted with the second snap 41, with the second snap 41 being able to be inserted into or released from the second slot 42 in a horizontal direction.

The replaceable panel structure provided by the disclosed embodiments may be applied to sockets, switches, temperature sensors or other electrical apparatus elements, and is used for realizing the replaceability of the panels of the electrical apparatus elements, wherein this embodiment is described by taking the replaceable panel structure being applied to a socket as example. During assembling the replaceable panel structure provided by the disclosed embodiments, the second snap 41 is inserted into the second slot 42 in a horizontal direction. At this moment, the panel main body 2 is inclined. Then, the end of the panel main body 2 where the first snap structures 3 are located is pressed down, and the panel main body 2 is rotated around a joint point of the first snap 41 with the second slot 42, until the first elastic snap 31 is stopped by the stop block 32 and then deformed and snapped into the first slot 33. During disassembly, the end of the panel main body 2 where the first snap structures 3 are located is moved upward, the panel main body 2 is rotated around the joint point of the second snap 41 with the second slot 42 such that the first elastic snap 31 is stopped and pressed by the stop block 32 and then deformed and released from the first slot 33, and the second snap 41 is released from the second slot 42 in a horizontal direction. The whole assembling and disassembling process is simple and convenient, and the cooperative use of the first snap structures 3 and the second snap structures 4 makes the joint of the panel with the base 1 stable. Moreover, during disassembly, the second snap 41 is released from the second slot 42 in a horizontal direction, i.e., in a direction toward a notch of the second slot 42, so it is not required to overcome the snapping force between the second snap 41 and the second slot 42 during disassembly, and it is only required to overcome a single-side snapping force between the first snap 31 and the first slot 32, so that the it is easy to disassemble and less likely to damage after multiple times of disassembling.

In addition, in this embodiment, the second snap 41 is a non-elastic snap. By designing the snap in each of the first snap structures 3 to be an elastic snap and the snap in each of the second snap structures 4 to be a non-elastic snap, the installation of the panel on the base by the snap structure is more stable.

Figure 2:
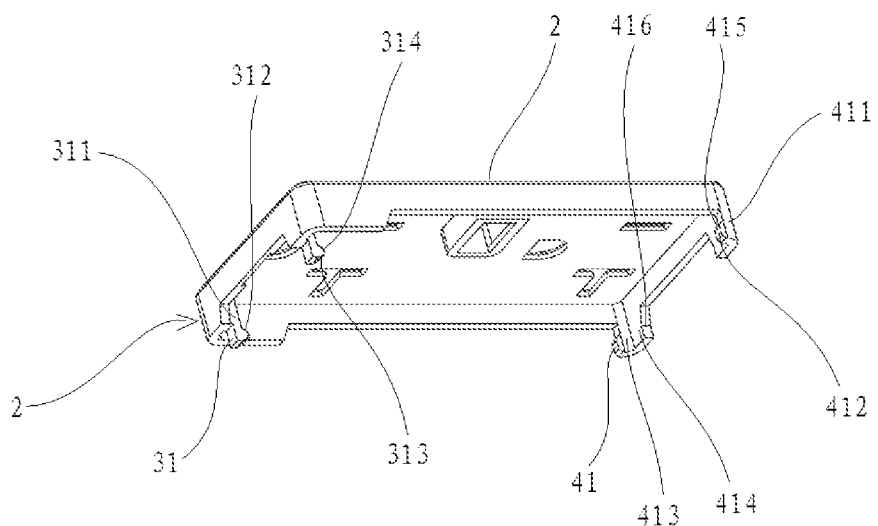
FIG. 2 is a perspective view of a panel portion of the replaceable panel structure according to embodiment 1.

Referring to FIG. 2, the first elastic snap 31 is hook-like and includes a handle 311 and a first protruded snapping portion 312. One end of the handle 311 is connected to the panel main body 2, while the first protruded snapping portion 312 is provided on a side wall of the other end of the handle.

Figure 3:
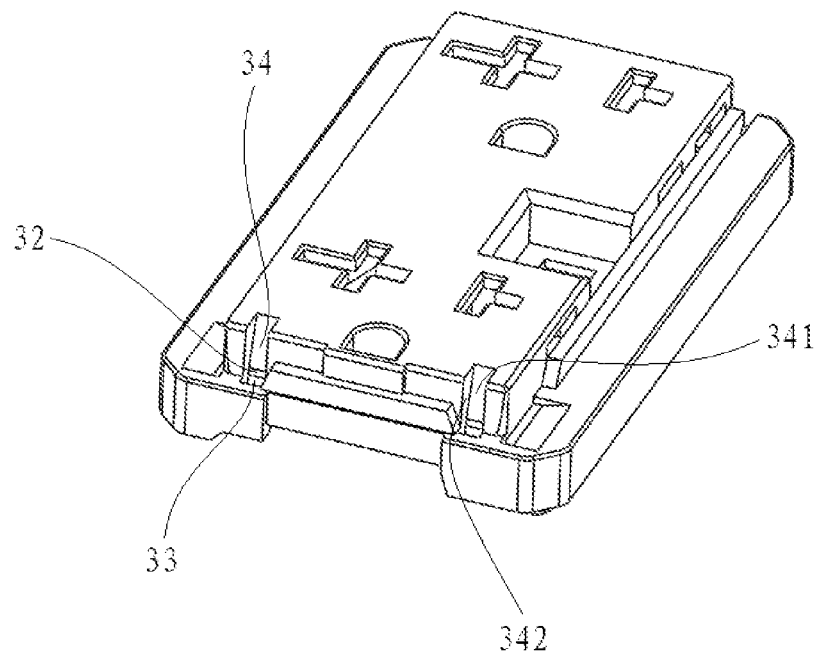
FIG. 3 is a perspective view of a base portion of the replaceable panel structure according to embodiment 1 viewed from the first slot.

Then referring to FIG. 3, in the process of the first elastic snap 31 being snapped into the base 1 along with the panel main body 2 or being released from the first slot 33 along with the panel main body 2, the first protruded snapping portion 312 is stopped and pressed by the stop block 32, and the handle 311 is elastically deformed to rotate around a connection point with the panel main body 2 in a direction away from the stop block 32, so that the first protruded snapping portion 312 passes over the stop block 32 and the handle 311 is restored to allow the first protruded snapping portion 312 to be snapped into or released from the first slot 33.

A press-guide inclined plane 341 is formed above the stop block 32. A lower end of the press-guide inclined plane 341 is connected with an edge, pressing the first protruded snapping portion 312, of the stop block 32, and in the process of first elastic snap 31 being vertically inserted along the press-guide inclined plane 341, the first protruded snapping portion 312 is pressed by the press-guide inclined plane 341 and the handle 311 gradually rotates around the connection point with the panel main body 2 in the direction away from the stop block 32, so that the first protruded snapping portion 312 passes over the stop block 32 and the handle 311 is restored to allow the first protruded snapping portion 312 to be snapped into the first slot 33. An upper end face of the first protruded snapping portion 312 is designed to an release-guide inclined plane 313. When the first elastic snap 31 is released, the first protruded snapping portion 312 is pressed by the release-guide inclined plane 313 and the handle 311 gradually rotates around the connection point with the panel main body 2 in the direction away from the stop block 32, so that the first protruded snapping portion 312 passes over the stop block 32 and the handle 311 is restored to allow the first protruded snapping portion 312 to be released from the first slot 33.

The arrangement of the press-guide inclined plane 341 allows the first protruded snapping portion 312 to be in transition contact with the press-guide inclined plane 341 and then to reach the edge of the stop block 32, so that the handle 311 gradually rotates around the connection point with the panel main body 2 in the direction away from the stop block 32, the first protruded snapping portion 312 gradually passes over the stop block 32 and the handle 311 is restored to allow the first protruded snapping portion 312 to be snapped into the first slot 33. Thus, it is convenient for the first protruded snapping portion 312 to pass by the edge of the stop block 32, the process of the first protruded snapping portion 312 being snapping into the first slot 33 is smooth and quick, and it is less likely to damage the connection point of the handle 311 with the panel main body 2.

The release-guide inclined plane 313 makes the contact with the stop block 32 smooth when the first protruded snapping portion 312 is released from the first slot 33, so that it is convenient for the first protruded snapping portion 312 to pass by the edge of the stop block 32, the process of the first protruded snapping portion 312 being released from the first slot 33 is smooth and quick, and it is less likely to damage the connection point of the handle 311 with the panel main body 2.

Guide side walls 342 are provided on two sides of the press-guide inclined plane 341, the press-guide inclined plane 341 and the guide side walls 342 form a snap-in guide press groove 34, and the lower end face of the first protruded snapping portion 312 is designed to a fit inclined plane 314 fitted with the press-guide inclined plane 341. By the guide side walls 342 and the snap-in guide press groove 34, the first protruded snapping portion 312 may be limited in a direction vertical to the guide side walls 342.

Figure 4:
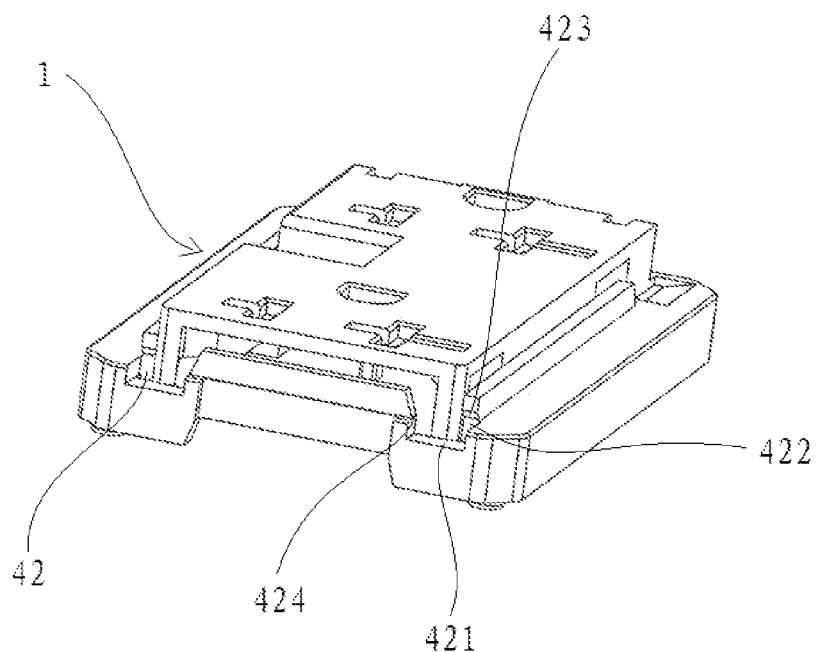
FIG. 4 is a perspective view of a base portion of the replaceable panel structure according to embodiment 1 viewed from the second slot.

Referring to FIG. 2 and FIG. 4, the specific form of the second snap 41 and the second slot 42 of each of the snap structures 4 may be various. In this embodiment, the second snap 41 includes a main body portion 411 with an end connected to the panel main body 2, and a second protruded snapping portion 412 disposed on a side wall of the main body portion 411; and the second slot 42 includes a main groove portion 421 for allowing the main body portion 411 to be horizontally embedded thereinto, and a snap-slot portion 422 for allowing the second protruded snapping portion 412 horizontally embedded thereinto.

Preferably, the second slot 42 is formed at an end corner of the base 1, the main body portion 411 includes a quarter arc plate 413 and a flat plate 414 connected to one end of the arc plate 413, and the second protruded snapping portion 412 is disposed on an end face of the other end of the arc plate 413. The arc plate 413 makes a portion of the second snap 41 exposed outside smooth, so that the damage to the outside may be effectively avoided.

One end of the flat plate 414 not connected to the arc plate 413 forms an inwardly concave sharp corner groove or an outwardly convex sharp corner, and a sharp corner or sharp corner groove fitted with the sharp corner groove or sharp corner is formed on a corresponding side wall of the main groove portion 421. In this embodiment, one end of the flat plate 414 not connected to the arc plate 413 forms an inwardly concave sharp corner groove 416, and a sharp corner 424 fitted with the sharp corner groove is formed on a corresponding side wall of the main groove portion 421. Through the fit structure of the share corner with the sharp corner groove, the second slot 42 may limit the second snap 41, and two sides of the sharp corner or sharp corner groove may disperse a force resulted from the joint of the second snap 41 and the second slot 42, so that the damage to the second snap 41 and the second slot 42 may be reduced and the service life is prolonged.

The upper end face of the second protruded snapping portion 412 is designed to be a first inclined plane 415, and a second inclined plane 423 in insertion fit with the first inclined plane 415 is formed on a corresponding side wall of the snap-slot portion 422. The first inclined plane 415 and the second inclined plane 423 facilitate the release of the second protruded snapping portion 412 from the second slot 42 during disassembling the panel.

The first snap structures 3 and the second snap structures 4 are located at two ends of the panel main body 2, respectively.

There are two first snap structures 3 and two second snap structures 4. In this embodiment, the first snap structures 3 and the second snap structures 4 are located at two ends of a length direction of the panel main body 2, respectively, the two first snap structures 3 are located at two ends of a width direction of one end of the panel main body 2, respectively, and the two second snap structures are located at two ends of a width direction of the other end of the panel main body 2, respectively. Such a distribution makes the joint of the panel main body 2 with the base more stable.

The assembling and disassembling process of the replaceable panel structure provided by the disclosed embodiments is as follows.

Figure 5:
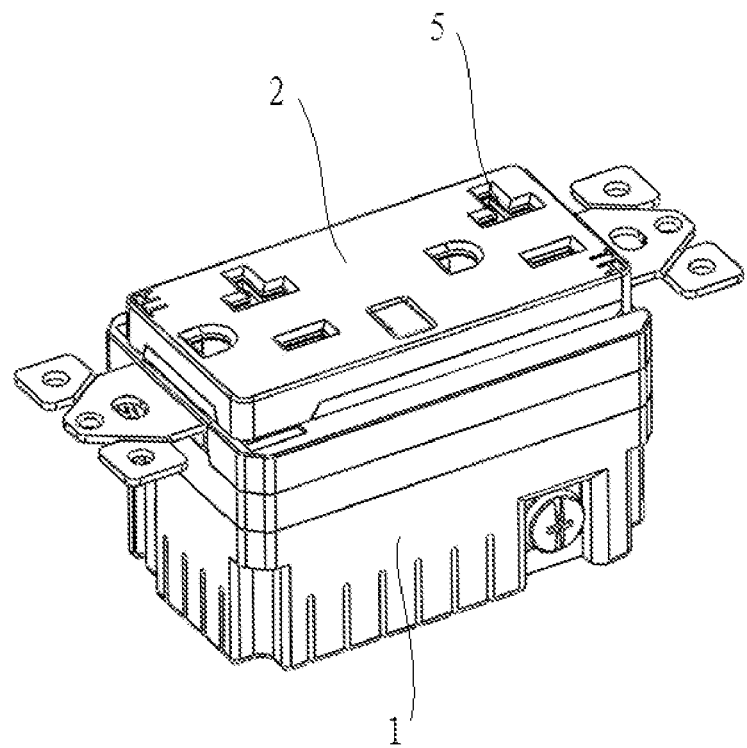
FIG. 5 is a perspective view of the replaceable panel structure according to embodiment 1 and the socket with a replaceable panel according to embodiment 2, where a state of the panel being mounted on the base is shown.

During assembling, the panel main body 2 is inclined, the second snap 41 is inserted into the second slot 42 in a horizontal direction, and then one end of the panel main body 2 where the first snap structures 3 are located is pressed down by taking a joint point of the second snap 41 and the second slot 42 as an axis, so that one end having the first snap 31 of the panel main body 2 is rotated in a direction close to the first slot 33. The fit inclined plane 314 of the first protruded snapping portion 312 gradually comes into contact with the press-guide inclined plane 341 and then moves toward the first slot 33 along the press-guide inclined plane 341. The fit inclined plane 314 of the first protruded snapping portion 312 is pressed by the press-guide inclined plane 341, and the handle 311 is gradually rotated around a connection point with the panel main body 2 in a direction away from the stop block 32, so that the first protruded snapping portion 312 passes over the stop block 32, and the handle 311 is restored to allow the first protruded snapping portion 312 to be snapped into the first slot 33. Accordingly, the assembling of the panel is completed, as shown in FIG. 5.

During disassembling, one end of the panel main body 2 where the first snap structures 3 are located is moved upward, and the panel main body 2 is rotated around the joint point of the second snap 41 with the second slot 42, so that the release-guide inclined plane 313 of the first elastic snap 31 comes into contact with the stop block 32 and is pressed by the stop block 32. Thus, the handle 311 is gradually rotated around connection point with the panel main body 2 in the direction away from the stop block 32, the first protruded snapping portion 312 passes over the stop block 32, and the handle 311 is restored to allow the first protruded snapping portion 312 to be released from the first slot 33. Under the action of the restoring force of the handle 311, the first protruded snapping portion 312 is allowed to move away from the stop block 32 along the press-guide inclined plane 341. Then, one end having the first snap 31 of the panel main body 2 is rotated in a direction close to the second slot 42 by taking the joint point of the second snap 41 with the second slot 42 as an axis. When the panel main body 2 is inclined to a degree of easily taking out the second snap 41, the second snap 41 is taken out from the second slot in a horizontal direction. Accordingly, the disassembling of the panel is completed, as shown in FIG. 1.

Embodiment 2

Referring to FIG. 1 to FIG. 5, this embodiment provides a socket with a replaceable panel, including the replaceable panel structure described in embodiment 1. Jacks 5 are provided on the panel main body 2.

Embodiment 3

Figure 6:
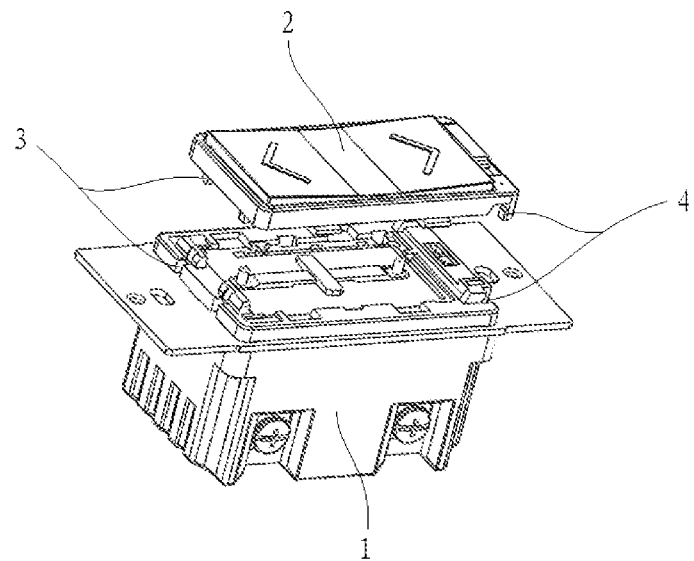
FIG. 6 is a perspective view of a replaceable panel structure according to embodiment 3, where a state of the panel being separated from the base is shown.
Figure 7:
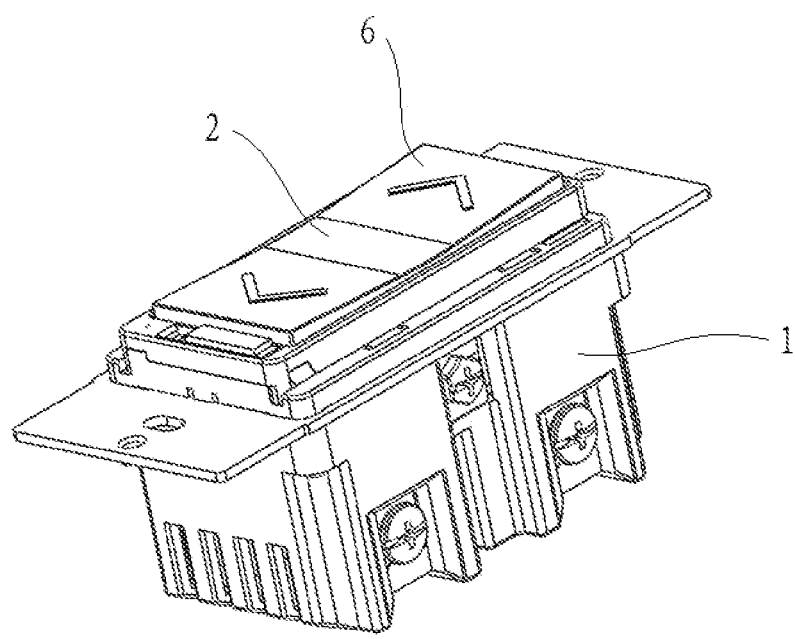
FIG. 7 is a perspective view of the replaceable panel structure according to embodiment 3, where a state of the panel being mounted on the base is shown.

Referring to FIG. 6 and FIG. 7, this embodiment provides a switch with a replaceable panel, including the replaceable panel structure described in embodiment 1. A switch button 6 is provided on the panel main body 2.

Embodiment 4

This embodiment provides a humidity sensor with a replaceable panel, including the replaceable panel structure described in embodiment 1. A function button of the sensor is provided on the panel main body 2.

Apparently, the foregoing embodiments are merely examples for clear description, and not intended to limit implementations. A person of ordinary skill in the art may make changes or variations in other different forms on the basis of the foregoing description. All implementations cannot be enumerated herein. All apparent changes or variations derived from the foregoing description shall fall into the protection scope of the disclosed embodiments.

What is claimed is:

1. A replaceable panel structure, the replaceable panel structure comprising:
   a base (1);
   a panel main body (2); and
   a snap structure to replaceably mount the panel main body (2) to the base (1), wherein the snap structure comprises:
      a pair of first snap structure assemblies (3), each one of the pair of first snap structure assemblies (3) being disposed in one of two first corner regions of the replaceable panel structure, wherein each one of the pair of first snap structure assemblies (3) comprises:
         a first elastic snap member (31) extending downward from a respective one of the two first corner regions of the panel main body (2), the first elastic snap member (31) comprising a handle portion (311) and a protruding tab member (312), the protruding tab member (312) extending substantially perpendicular to a sidewall of one end of the handle portion (311); and
         a stop block (32) disposed on the base (1), the stop block (32) engaging the first elastic snap member (31) as the first elastic snap member (31) is directed onto the stop block (32);
         a first slot (33) at an end of the stop block (32) away from a top surface of the panel main body (2), the first slot (33) receiving the protruding tab member (312) of the first elastic snap member (31), wherein the first elastic snap member (31) is pressed against the stop block (32) and deformed when the panel main body (2) is mounted to the base member (1), and the protruding tab member (312) is snapped into the first slot (33); and
      a pair of second snap structure assemblies (4), each one of the pair of second snap structure assemblies (4) being disposed in one of two second corner regions of the replaceable panel structure, each one of the two second corner regions being disposed on a side of the replaceable panel structure opposite a respective one of the two first corner regions, wherein each one of the pair of second snap structure assemblies (4) comprises:
         a second snap member (41) disposed on a corner post member of a respective one of the two second corner regions and a second slot (42) disposed on the base (1), the second slot to receive the second snap member (41) as the panel main body is moved in a horizontal direction relative to a front surface of the base (1).

2. The replaceable panel structure according to claim 1, wherein:
   the protruding tab member (312) of the first elastic snap member (31) is hook-like and wherein an other end of the handle portion (311) is connected to the panel main body (2); and
   wherein the first protruding tab member (312) engages the stop block (32), and the handle portion (311) is elastically deformed by the engagement with the stop block (32) to rotate around a connection point with the panel main body (2) in a direction away from the stop block (32), so that the first protruding tab member (312) passes over the stop block (32) and the handle (311) is restored to a non-deformed state to allow the first protruded snapping portion (312) to be snapped into the first slot (33).

3. The replaceable panel structure according to claim 2, wherein the base (1) comprises a press-guide inclined plane (341) formed above the stop block (32); a lower end of the press-guide inclined plane (341) to engage and press the first protruding tab member (312) as the first elastic snap member (31) is inserted along the press-guide inclined plane (341), wherein as the first protruding tab member (312) is pressed by the press-guide inclined plane (341) the handle portion (311) rotate around the connection point with the panel main body (2) in the direction away from the stop block (32), so that the first protruding tab member (312) passes over the stop block (32) and the handle portion (311) moves to the non-deformed state to allow the first protruding tab member (312) to be snapped into the first slot (33); and an upper end face of the first protruding tab member (312) comprises a release-guide inclined plane (313), wherein when the first elastic snap member (31) is released, the first protruding tab member (312) is pressed by the release-guide inclined plane (313) and the handle portion (311) rotates around the connection point with the panel main body (2) in the direction away from the stop block (32), so that the first protruding tab member (312) passes over the stop block (32) and the handle portion (311) is restored to the non-deformed state to allow the first protruding tab member (312) to be released from the first slot (33).

4. The replaceable panel structure according to claim 3, wherein guide side walls (342) are provided on two sides of the press-guide inclined plane (341), the press-guide inclined plane (341) and the guide side walls (342) forming a snap-in guide press groove (34), and the lower end face of the first protruding tab member (312) comprises a fit inclined plane (314) to fit within the guide side walls of the press-guide inclined plane (341).

5. The replaceable panel structure according to claim 1, wherein:

the second snap member (41) comprises a main body portion (411) with an end connected to the panel main body (2), and a second protruded snapping portion (412) disposed on a side wall of the main body portion (411); and second slot (42) comprises a main groove portion (421) for allowing the main body portion (411) to be horizontally embedded thereinto, and a snap-slot portion (422) for allowing the second protruded snapping portion (412) horizontally embedded thereinto.

6. The replaceable panel structure according to claim 5, wherein the second slot (42) is formed at each one of two end corners of the base (1), the main body portion (411) comprises a quarter arc plate (413) and a flat plate (414) connected to one end of the arc plate (413), and the second protruded snapping portion (412) is disposed on an end face of an other end of the arc plate (413).

7. The replaceable panel structure according to claim 6, wherein one end of the flat plate (414) not connected to the arc plate (413) forms an inwardly concave sharp corner groove or an outwardly convex sharp corner, and a sharp corner or sharp corner groove configured to be fitted with the inwardly concave sharp corner groove or outwardly convex sharp corner is formed on a corresponding side wall of the main groove portion (421).

8. The replaceable panel according to claim 7, wherein the upper end face of the second protruded snapping portion (412) comprises a first inclined plane (415), and the base (1) comprises a second inclined plane (423) formed on a side wall of the snap-slot portion (422) wherein the second inclined plane (423) is to receive and mate against the first inclined plane (415) of the panel main body (2).

9. The replaceable panel structure according to claim 1, wherein the pair of first snap structure assemblies (3) and the pair of second snap structure assemblies (4) are formed at opposing ends of the panel main body (2).

10. A socket with a replaceable panel, the replaceable panel structure comprising a base (1), and a panel main body (2) which is replaceably mounted on the base (1) by a snap structure, wherein the snap structure comprises:

a pair of first snap structure assemblies (3), each one of the pair of first snap structure assemblies (3) being disposed in one of two first corner regions of the replaceable panel structure, wherein each one of the pair of first snap structure assemblies (3) comprises:

a first elastic snap member (31) extending downward from a respective one of the two first corner regions of the panel main body (2), the first elastic snap member (31) comprising a handle portion (311) and a protruding tab member (312), the protruding tab member (312) extending substantially perpendicular to a sidewall of one end of the handle portion (311);

a stop block (32) disposed on the base (1), the stop block (32) engaging the first elastic snap member (31) as the first elastic snap member (31) is directed onto the stop block (32);

a first slot (33) at an end of the stop block (32) away from a top surface of the panel main body (2), the first slot (33) receiving the protruding tab member (312) of the first elastic snap member (31), wherein the first elastic snap member (31) is pressed against the stop block (32) and deformed when the panel main body (2) is mounted to the base member (1), and the protruding tab member (312) is snapped into the first slot (33); and a pair of second snap structure assemblies (4), each one of the pair of second snap structure assemblies (4) being disposed in one of two second corner regions of the replaceable panel structure, each one of the two second corner regions being disposed on a side of the replaceable panel structure opposite a respective one of the two first corner regions, wherein each one of the pair of second snap structure assemblies (4) comprises:

a second snap member (41) disposed on a corner post member of a respective one of the two second corner regions and a second slot (42) disposed on the base (1), the second slot to receive the second snap member (41) as the panel main body is moved in a horizontal direction relative to a front surface of the base (1); and wherein jacks are provided on the panel main body (2).

11. A switch with a replaceable panel, the replaceable panel structure comprising a base (1), and a panel main body (2) which is replaceably mounted on the base (1) by a snap structure, wherein the snap structure comprises:

a pair of first snap structure assemblies (3), each one of the pair of first snap structure assemblies (3) being disposed in one of two first corner regions of the replaceable panel structure, wherein each one of the pair of first snap structure assemblies (3) comprises:

a first elastic snap member (31) extending downward from a respective one of the two first corner regions of the panel main body (2), the first elastic snap member (31) comprising a handle portion (311) and a protruding tab member (312), the protruding tab member (312) extending substantially perpendicular to a sidewall of one end of the handle portion (311);

a stop block (32) disposed on the base (1), the stop block (32) engaging the first elastic snap member (31) as the first elastic snap member (31) is directed onto the stop block (32);

a first slot (33) at an end of the stop block (32) away from a top surface of the panel main body (2), the first slot (33) receiving the protruding tab member (312) of the first elastic snap member (31), wherein the first elastic snap member (31) is pressed against the stop block (32) and deformed when the panel main body (2) is mounted to the base member (1), and the protruding tab member (312) is snapped into the first slot (33); and a pair of second snap structure assemblies (4), each one of the pair of second snap structure assemblies (4) being disposed in one of two second corner regions of the replaceable panel structure, each one of the two second corner regions being disposed on a side of the replaceable panel structure opposite a respective one of the two first corner regions, wherein each one of the pair of second snap structure assemblies (4) comprises:

a second snap member (41) disposed on a corner post member of a respective one of the two second corner regions and a second slot (42) disposed on the base (1), the second slot to receive the second snap member (41) as the panel main body is moved in a horizontal direction relative to a front surface of the base (1); and wherein a switch button is provided on the panel main body (2).

12. A humidity sensor with a replaceable panel, the replaceable panel structure comprising a base (1), and a panel main body (2) which is replaceably mounted on the base (1) by a snap structure, wherein the snap structure comprises:

a pair of first snap structure assemblies (3), each one of the pair of first snap structure assemblies (3) being disposed in one of two first corner regions of the replaceable panel structure, wherein each one of the pair of first snap structure assemblies (3) comprises:

a first elastic snap member (31) extending downward from a respective one of the two first corner regions of the panel main body (2), the first elastic snap member (31) comprising a handle portion (311) and a protruding tab member (312), the protruding tab member (312) extending substantially perpendicular to a sidewall of one end of the handle portion (311);

a stop block (32) disposed on the base (1), the stop block (32) engaging the first elastic snap member (31) as the first elastic snap member (31) is directed onto the stop block (32);

a first slot (33) at an end of the stop block (32) away from a top surface of the panel main body (2), the first slot (33) receiving the protruding tab member (312) of the first elastic snap member (31), wherein the first elastic snap member (31) is pressed against the stop block (32) and deformed when the panel main body (2) is mounted to the base member (1), and the protruding tab member (312) is snapped into the first slot (33); and a pair of second snap structure assemblies (4), each one of the pair of second snap structure assemblies (4) being disposed in one of two second corner regions of the replaceable panel structure, each one of the two second corner regions being disposed on a side of the replaceable panel structure opposite a respective one of the two first corner regions, wherein each one of the pair of second snap structure assemblies (4) comprises:

a second snap member (41) disposed on a corner post member of a respective one of the two second corner regions and a second slot (42) disposed on the base (1), the second slot to receive the second snap member (41) as the panel main body is moved in a horizontal direction relative to a front surface of the base (1); and wherein a function button of the sensor is provided on the panel main body (2).

* * * * *